United States Patent
Mafi

(10) Patent No.: US 12,312,516 B2
(45) Date of Patent: May 27, 2025

(54) OUTDOOR REFACING SYSTEMS AND METHODS

(71) Applicant: Pixiu Solutions Inc., Brantford (CA)

(72) Inventor: Roozbeh Mafi, Brantford (CA)

(73) Assignee: Pixiu Solutions Inc., Brantford (CA)

( * ) Notice: Subject to any disclaimer, the term of this patent is extended or adjusted under 35 U.S.C. 154(b) by 161 days.

(21) Appl. No.: 17/980,901

(22) Filed: Nov. 4, 2022

(65) Prior Publication Data

US 2023/0143047 A1    May 11, 2023

Related U.S. Application Data

(60) Provisional application No. 63/278,349, filed on Nov. 11, 2021.

(51) Int. Cl.
| | | |
|---|---|---|
| C09J 7/38 | (2018.01) | |
| C09J 5/00 | (2006.01) | |
| C09J 7/24 | (2018.01) | |
| C09J 7/40 | (2018.01) | |

(52) U.S. Cl.
CPC . *C09J 7/38* (2018.01); *C09J 5/00* (2013.01); *C09J 7/241* (2018.01); *C09J 7/245* (2018.01); *C09J 7/405* (2018.01); *C09J 2301/302* (2020.08); *C09J 2301/408* (2020.08); *C09J 2400/28* (2013.01); *C09J 2423/006* (2013.01); *C09J 2423/045* (2013.01); *C09J 2423/105* (2013.01); *C09J 2427/006* (2013.01); *C09J 2483/005* (2013.01)

(58) Field of Classification Search
CPC ....... C09J 7/38; C09J 5/00; C09J 7/241; C09J 7/245; C09J 7/405; C09J 2301/302; C09J 2301/408; C09J 2400/28; C09J 2423/006; C09J 2423/045; C09J 2423/105; C09J 2427/006; C09J 2483/005
See application file for complete search history.

(56) References Cited

U.S. PATENT DOCUMENTS

| | | | |
|---|---|---|---|
| 5,456,976 A * | 10/1995 | LaMarca, II | ............ B32B 5/245 428/317.1 |
| 6,080,458 A | 6/2000 | Russell et al. | |
| 7,101,598 B2 | 9/2006 | Hubbard | |
| 7,368,155 B2 | 5/2008 | Larson et al. | |
| 7,475,519 B2 | 1/2009 | Swann | |
| 7,771,807 B2 | 8/2010 | Hubbard | |

(Continued)

FOREIGN PATENT DOCUMENTS

| | | | | |
|---|---|---|---|---|
| NL | 9002557 A * | 6/1992 | ............ | B32B 27/08 |

OTHER PUBLICATIONS

Machine translation of NL 9002557 A. (Year: 1992).*

*Primary Examiner* — Patricia L. Nordmeyer
(74) *Attorney, Agent, or Firm* — Own Innovation Inc.; James W. Hinton

(57) ABSTRACT

Provided is an outdoor facing system and method is for re-facing an object. The outdoor re-facing system includes a plasticized facing layer, the facing layer having an exterior surface. The outdoor re-facing system includes an interior surface and an adhesive layer comprising a pressure-sensitive adhesive resistant to plasticizer migration, the adhesive layer having a first surface attached to the interior surface of the facing layer and a second surface for adhering the re-facing system to the re-facing object.

20 Claims, 12 Drawing Sheets

(56) References Cited

U.S. PATENT DOCUMENTS

2004/0157074 A1     8/2004   Hubbard
2004/0191508 A1     9/2004   Hubbard et al.
2006/0062955 A1*   3/2006   Liu ........................ B32B 21/04
                                                                                        156/247
2009/0220720 A1     9/2009   Mohseen et al.

* cited by examiner

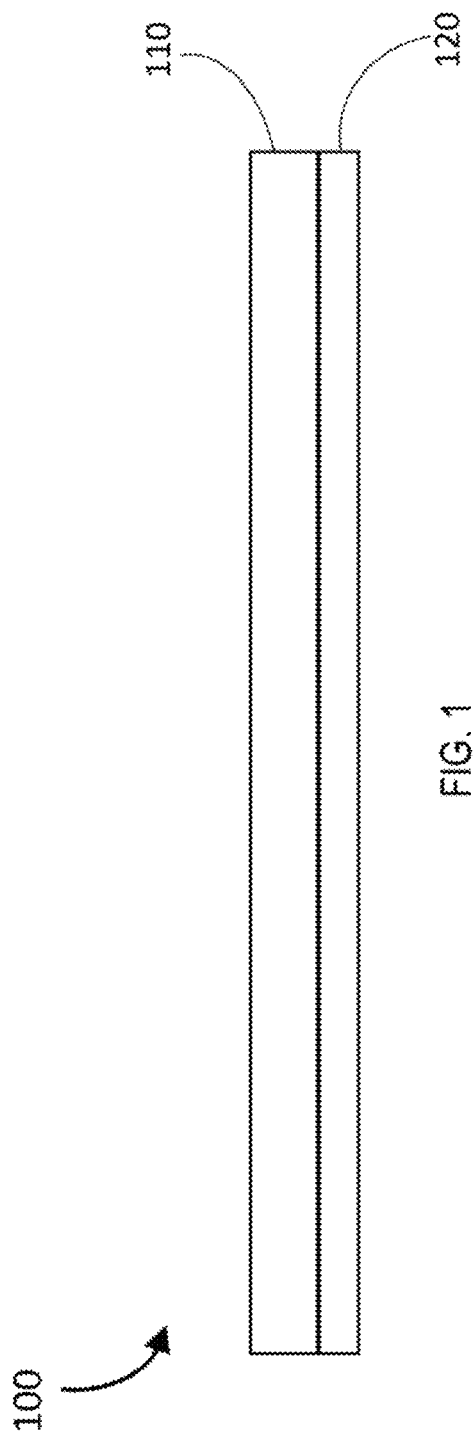

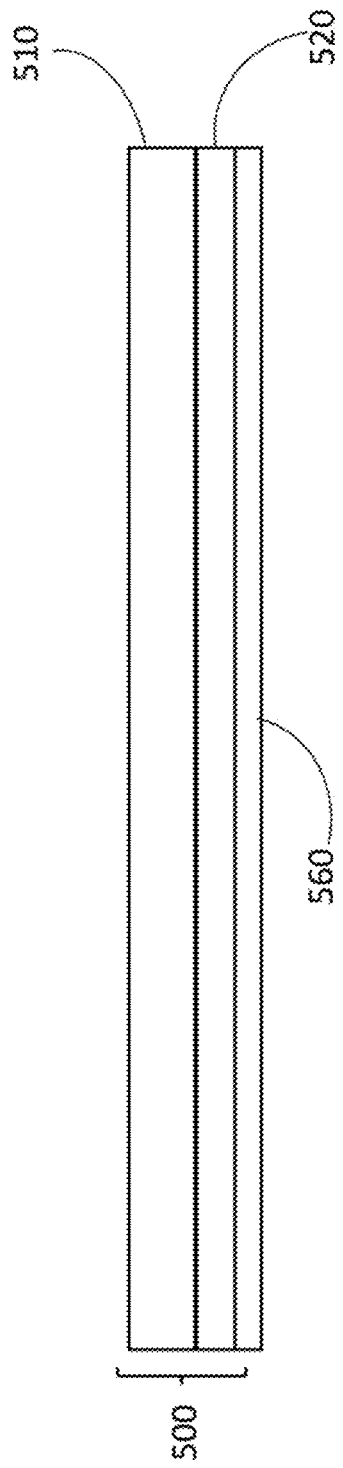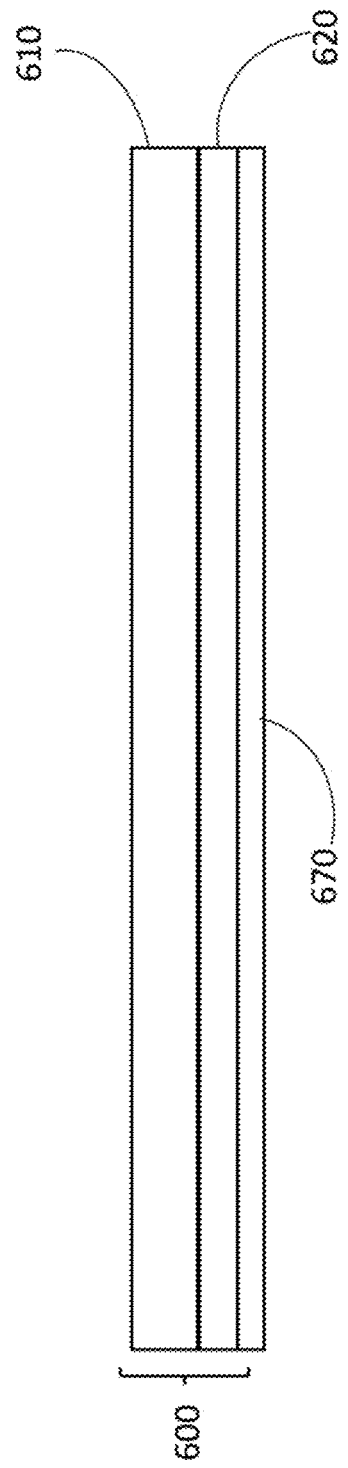

OUTDOOR REFACING SYSTEMS AND METHODS

TECHNICAL FIELD

The embodiments disclosed herein relate to re-facing outdoor structures, and, in particular to systems and methods for re-facing roofs, decks, window and door frames and pools.

INTRODUCTION

Outdoor objects experience wear and tear constantly due to the nature of the environment, which they are in. For example, rain, ice, snow, extreme temperatures, ultraviolet (UV) light, falling objects, foot traffic, etc., can all degrade the structure and appearance of an outdoor object such as shingles on a roof, boards on a deck, frame of the windows and doors or the lining of a pool. Current solutions for re-facing these objects are often costly and time consuming. For example, a deck may require all new wooden boards or composite boards, which are very expensive. The material chosen for a roof may necessitate frequent replacement, e.g. asphalt shingles, or may be prohibitively expensive, e.g. metal roof, wooden shakes.

Accordingly, there is a need for re-facing or facing systems and materials that allow for quick installation of full or partial long lasting solutions which are reasonably priced.

SUMMARY

Provided is an outdoor facing system for a re-facing object. The system includes a plasticized facing layer, the facing layer having an exterior surface and an interior surface; and an adhesive layer comprising a pressure-sensitive adhesive resistant to plasticizer migration, the adhesive layer having a first surface attached to the interior surface of the facing layer and a second surface for adhering the re-facing system to the re-facing object.

The system may further include a release liner attached to the second surface of the adhesive layer, wherein prior to adhering the re-facing system to the re-facing object the second surface is exposed by removal of the release liner.

The release liner may be selected from the group consisting of silicon-coated paper, silicon-coated plastic, polypropylene (PP), and polyethylene (PE).

The facing layer may include polyvinyl chloride (PVC).

The facing layer may include thermoplastic olefin (TPO).

The bond strength of the pressure-sensitive adhesive may range from 1 lb/inch to 20 lb/inch in 180° peel adhesion test.

The facing layer may be ultraviolet light (UV) resistant.

The facing layer may be temperature resistant at a range between −50° F. to 150° F.

The facing layer may be abrasion resistant.

A physical property of the facing layer may be selected from the group consisting of rigid, semi-rigid, and flexible.

The re-facing system may be selected from the group consisting of pre-cut tiles, a roll which can be cut to a desired size, and sheets which can be cut to a desired size.

The re-facing object may be a deck.

The re-facing object may be a lining of a pool. The pressure-sensitive adhesive may be chlorine resistant. The facing layer may be chlorine resistant. The facing layer may be phosphorescent. The facing layer may change color.

The re-facing object may be a roof.

The re-facing object may be a window frame.

The re-facing object may be a door frame.

Provided is a method of using an outdoor re-facing system to re-face a re-facing object, the system including a facing layer having an exterior surface and an interior surface, an adhesive layer having a first surface attached to the interior facing layer surface and a second surface comprising a pressure-sensitive adhesive. The method includes placing the second adhesive layer surface of the adhesive layer in direct contact with a desired location on the re-facing object; and applying pressure to the exterior facing layer surface of the re-facing system to adhere the re-facing system to the re-facing object by the pressure-sensitive adhesive of the adhesive layer.

The method may further include a release liner attached to the second adhesive layer surface of the adhesive layer, and the method may further include removing the release liner from the adhesive layer.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 1 is a side view of a re-facing system including a plasticized facing layer and an adhesive layer, according to one embodiment.

FIG. 5 is a side view of a re-facing system including a plasticized facing layer and an adhesive layer in use on a roof, according to one embodiment.

FIG. 6 is a side view of a re-facing system including a plasticized facing layer and an adhesive layer in use on a window frame, according to one embodiment.

DETAILED DESCRIPTION

Figure 2A:
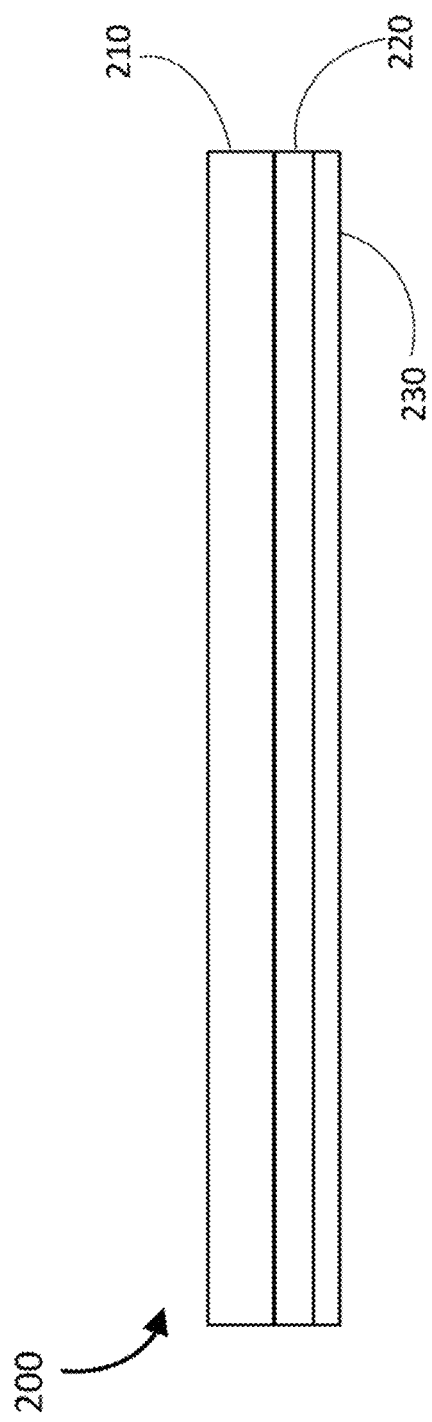
FIGS. 2A and 2B are side and perspective views, respectively of a re-facing system including a plasticized facing layer, an adhesive layer, and a releasing liner, according to one embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

FIG. 1 is a side view of a re-facing system 100 including a plasticized facing layer 110 and an adhesive layer 120, according to one embodiment.

Facing layer 110 has an exterior surface (top of facing layer 110) and an interior surface (bottom of facing layer 110). The exterior surface has an appearance and may have a texture that mimics the desired look and feel of a re-facing object. For example, if the re-facing object is a deck the facing layer may look like wood and may have a texture that mimic the texture of wood and/or a texture which prevents slipping.

Facing layer 110 is a plasticized material which may comprise polyvinyl chloride (PVC) or thermoplastic olefin (TPO). Other polymers may also be used such as thermoplastic materials including polyvinyl chloride (PVC), thermoplastic olefin (TPO), polyethylene and polypropylene, chlorinated polyethylene (CPE) or chloro-sulphinated polyethylene (CSPE). Thermosetting materials are EPDM, butyl rubber and neoprene. Facing layer 110 may or may not include reinforcing meshes/scrims or may include short or long fibers as reinforcing agents. Facing layer 110 may range from about 0.010-0.100 inches thick, preferably 0.020-0.080 inches thick.

The interior surface of facing layer 110 is attached to a first surface (top of adhesive layer 120) of the adhesive layer 120.

Adhesive layer 120 comprises a pressure-sensitive adhesive. That is, the adhesive of adhesive layer 120 bonds to the re-facing object after pressure is applied. The bond strength of the pressure-sensitive adhesive may range from 1 lb/inch to 20 lb/inch in 180° peel adhesion test. The pressure which needs to be applied to the re-facing system for the pressure-sensitive adhesive to adhere may range from 25 lbs to 200 lbs, preferably 50 lbs to 150 lbs.

Adhesive layer 120 comprises a second surface (bottom of adhesive layer 120) which in use is adhered to a re-facing object to attach refacing system 100 to the re-facing object.

The pressure-sensitive adhesive is resistant to plasticizer migration. Plasticizers are substances, which are added to a material to affect the plasticity of that material. Plasticizers can migrate out of the initial material and into adjoining substances such as adhesives. The adjoining substances may then be physically or chemically changed or degraded by the plasticizer The pressure-sensitive adhesive of re-facing system 100 does not allow for more than 20 percent migration of plasticizer into the pressure-sensitive adhesive and therefore also does not allow for migration of plasticizer through the pressure-sensitive adhesive into a re-facing object. This prevents changes to the adhesive and therefore degradation of the bond between re-facing system 100 and a re-facing object and also prevents changes to the re-facing object.

The pressure-sensitive adhesive may be a self-crosslinking polymer based on elastomer (natural, butyl, nitrile, and styrene butadiene rubbers), acrylate or silicone resins with crosslink density that may range from 2% to 80%.

The pressure-sensitive adhesive may also be resistant to high and/or low temperature and water. For example, the bond strength does not change more than 30 percent at heat aging test for two weeks at 122° F.

As facing layer 110 is exposed to the outdoor elements, it is necessary for facing layer 110 to be resistant to these elements, for example, UV light, high temperatures, low temperatures, temperature fluctuations, and abrasion and pressure due to weather and foot or vehicle traffic.

Adhesive layer 120 in use is not subject to direct physical contact or UV light but still requires resistance to some elements such as temperature, temperature fluctuations, and pressure.

Re-facing system 100 may exist as a roll which is unrolled and cut to a desired size during installation. Re-facing system 100 may exist as sheets or tiles which can be cut to a desired size during installation. Re-facing system 100 may exist as sheets or tiles which are pre-cut to a desired size and do not require further cutting during installation.

The relative sizes (lengths, widths and heights) of facing layer 110 and adhesive layer 120 are for illustrative purposes only and are not to scale.

In some embodiments, the thickness of the facing layer is less than 1.5 mm (+/−10%). In other embodiments the thickness of the facing layer may be greater or less than this figure.

In some embodiments the thickness of the adhesive layer may be between 0.010 inches to 0.080 inches.

In some embodiments, an entire re-facing object may be re-faced while in other embodiments a re-facing object may be only partially re-faced.

Specific use embodiments of a re-facing system, similar to re-facing system 100, are discussed in further detail below.

Figure 2B:
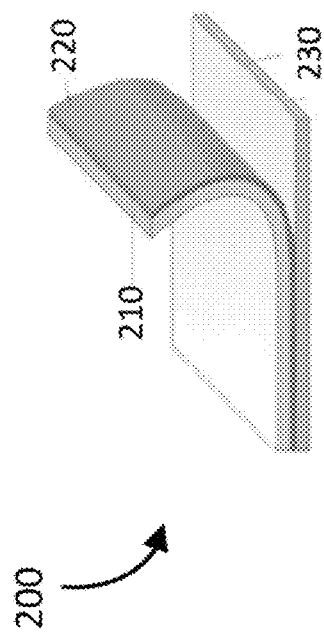

FIGS. 2A and 2B are side and perspective views of a re-facing system 200 including a plasticized facing layer 210, an adhesive layer 220, and a release liner 230, according to one embodiment.

Re-facing system 200 is similar to re-facing system 100 of FIG. 1, but further includes release liner 230.

Facing layer 210 is similar to facing layer 110 of FIG. 1 and adhesive layer 220 is similar to adhesive layer 120 of FIG. 1. Facing layer 210 includes an exterior surface (top of facing layer 210) and an interior surface (bottom of facing layer 210). The exterior surface has an appearance and texture of the desired look and feel of a re-facing object. Adhesive layer 220 comprises a pressure-sensitive adhesive and has a first surface which is attached to the interior surface of facing layer 210 and a second surface which is attached to release liner 230.

Release liner 230 is a removable layer which covers the second surface to both protect the pressure-sensitive adhesive and to prevent anything unwanted from adhering to the pressure-sensitive adhesive.

Release liner 230 may be any material that can be adhered to and removed from adhesive layer 220 without affecting the adhesive ability of adhesive layer 220. That material may be, but is not limited to, silicon-coated paper, silicon-coated plastic, polypropylene (PP) or polyethylene (PE).

Release liner 230 protects adhesive layer 220 in all situations which arise between manufacturing of re-facing system 200 and installation of re-facing system 200.

The relative sizes (lengths, widths and heights) of facing layer 210, adhesive layer 220, and release liner 230 are for illustrative purposes only and are not to scale.

Figure 3:
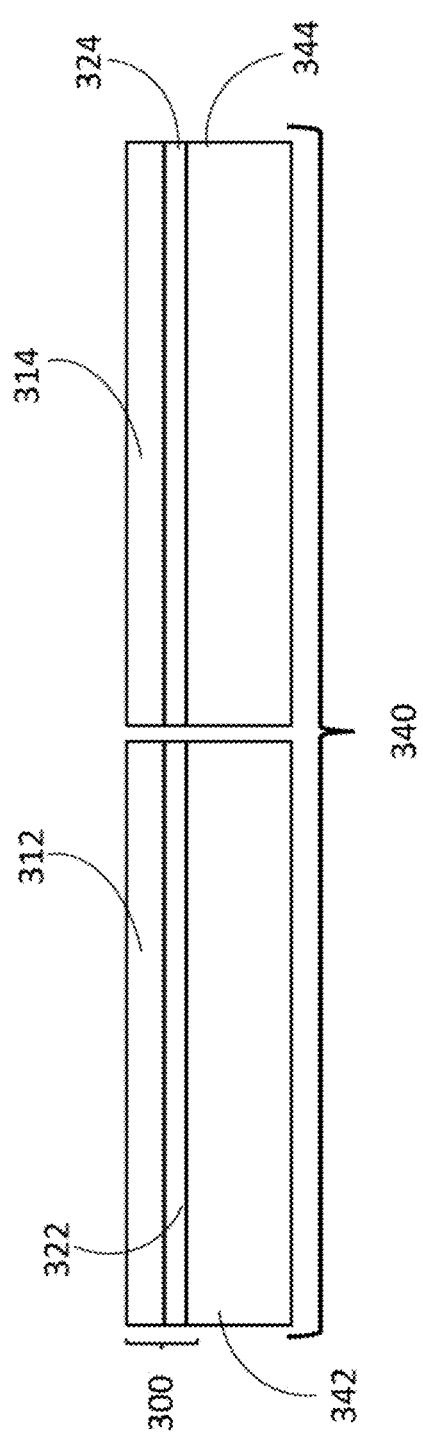
FIG. 3 is a side view of a re-facing system including a plasticized facing layer and an adhesive layer in use on a deck, according to one embodiment.

FIG. 3 is a side view of a re-facing system 300 including a plasticized facing layer 310 and an adhesive layer 320 in use on a deck 340, according to one embodiment.

Re-facing system 300 may be similar to re-facing system 100 of FIG. 1 or re-facing system 200 of FIG. 2A. In FIG. 3, two instances of the re-facing system 300, comprising facing layer 312 and adhesive layer 322, and facing layer 314 and adhesive layer 324 are in use on two deck boards 342 and 344 respectively.

The view of FIG. 3 is towards the end of deck boards 342 and 344 (the end being the smallest surface of a standard board). Only two deck boards of deck 340 are shown for illustrative purposes. In actual embodiments the deck may comprise many more boards.

Facing layers 312 and 314 each have an exterior surface (top of facing layers 312 and 314) and an interior surface (bottom of facing layers 312 and 314). The exterior surfaces of facing layers 312 and 314 have an appearance and texture which is desired by the owner of the deck. That is, the exterior surfaces may have the appearance of wood in both pattern and colour or may have any other appearance in pattern and colour that would be desired by a customer. The material of facing layers 312 and 324 may be embossed to achieve a feel and appearance of wood. The texture of the exterior surface is suitable for outdoor decking and enable the safety of anyone who may use the deck in any and all weather conditions. For example, the deck must not become too slippery when wet.

Facing layers 312 and 314 are thin to not add too much height to the deck and not too thin to not sufficiently cover any defects in the existing surface of the deck. Facing layer 110 may range from about 0.010-0.100 inches thick, preferably 0.020-0.080 inches thick.

Facing layers 312 and 314 are resistant to high or low temperatures, i.e., not melt or crack. Facing layers 312 and 314 are resistant to abrasion from heavy traffic or the elements of outdoors, such as hail. Facing layers 312 and 314 are resistant to damage or degradation due to UV light.

The material of facing layers 312 and 314 may be resistant to temperature as low as −18° C.

The material of facing layers 312 and 314 may be semi-rigid or flexible. Where the material is semi-rigid the re-facing system may exist as sheets or tiles which may be cut to the correct size during installation. The sheets or tiles may come pre-cut to standard widths and lengths of decking materials and may only require cuts to accommodate variation in length or width due to the specific design of a given deck, thus saving time spent on installation. Where the material is flexible the re-facing system may exist as sheets, tiles, or rolls which, as with a semi-rigid material, may be cut to the correct size during installation or may be pre-cut to standard sizes during manufacturing. Due to the imperfections in decking materials (e.g. warping of boards) a rigid material is not preferred.

Facing layers 312 and 314 comprise a plasticized material, for example, PVC or TPO.

Adhesive layers 322 and 324 each include a first surface (top of adhesive layers 322 and 324) which is attached to the respective interior surface of facing layers 312 and 314, and a second surface (bottom of adhesive layers 322 and 324) which in use adheres to the top side of deck boards 342 and 344, respectively.

Adhesive layers 322 and 324 comprise pressure-sensitive adhesive. The pressure-sensitive adhesive bonds to the surface of deck boards 342 and 344 after a sufficient amount of pressure is applied towards deck boards 342 and 344 on facing layers 312 and 314. The pressure may be applied with a tool such as a roller or trowel to ensure even application of pressure for establishing the bond between the pressure-sensitive adhesive and deck boards 342 and 344. The bond strength may range from 1 lb/inch to 20 lb/inch in 180° peel adhesion test.

Because facing layers 312 and 314 comprise plasticized material, the pressure-sensitive adhesive is resistant to plasticizer migration from the facing layers into the pressure-sensitive adhesive. Plasticizer migration could degrade the pressure-sensitive adhesive resulting in a loss of bonding between the re-facing system and deck boards 342 and 344, as well as degrading deck boards 342 and 344. The pressure sensitive adhesive may be a self-crosslinking polymer based on elastomer (natural, butyl, nitrile, and styrene butadiene rubbers), acrylate or silicone resins with crosslink density that may range from 2% to 80%.

The pressure-sensitive adhesive may also be resistant to high and/or low temperature and to water.

Re-facing system 300 may include a release liner which has been removed prior to adherence of adhesive layers 322 and 324 to the deck boards.

The deck which is to be re-faced may be made of wood or any other decking material. The decking material may be degraded and require re-facing or the owner of the deck may wish to re-face the deck for aesthetic or ease-of-use purposes.

The surface of the deck may require cleaning, sanding, or other treatment before re-facing system 300 may be applied to the deck.

Figure 4:
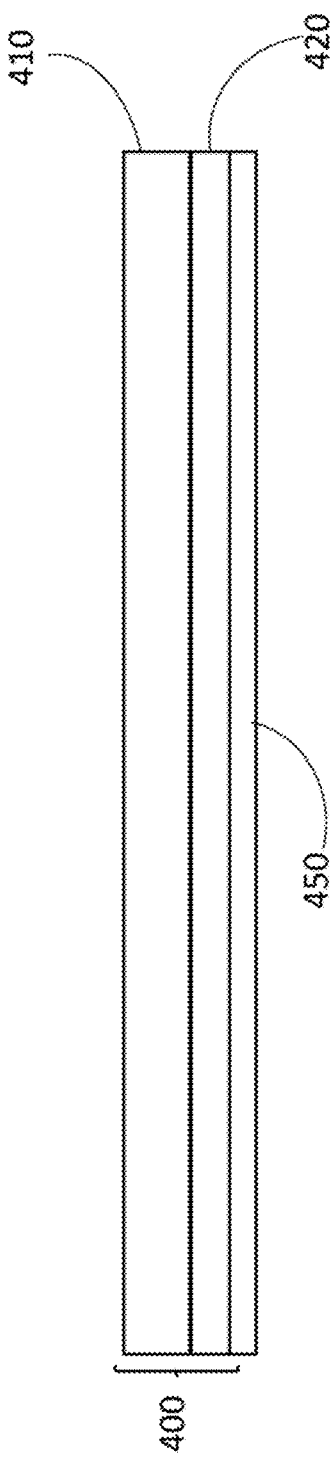
FIG. 4 is a side view of a re-facing system including a plasticized facing layer and an adhesive layer in use on a pool, according to one embodiment.

FIG. 4 is a side view of a re-facing system 400 including a plasticized facing layer and an adhesive layer in use on a pool 450, according to one embodiment.

Re-facing system 400 may be similar to re-facing system 100 of FIG. 1 or re-facing system 200 of FIG. 2A. Re-facing system 400 includes facing layer 410 and adhesive layer 420. FIG. 4 represents only a sub-section of pool 450. Re-facing system 400 is present on the interior of pool 450.

Facing layer 410 has an exterior surface (top of facing layer 410) and an interior surface (bottom of facing layer 410). The exterior surface of facing layer 410 has an appearance and texture which is desired by the owner of the pool (or customer). That is, the exterior surface may have an appearance in both pattern and colour that would be desired by a customer.

The material of facing layer 410 may be phosphorescent (glow-in-the-dark). The material of facing layer 410 may be color-changing.

The texture of the exterior surface is suitable for a pool lining. For example, where re-facing system 400 is used on the sides of a pool it should be smooth to prevent injury to users of the pool, while if re-facing system 400 is used on the bottom of a pool it may have a texture which provides traction for users of the pool.

Facing layer 410 is resistant to high or low temperatures, i.e., does not melt or crack at temperatures for the climate it is in. Facing layer 410 is resistant to abrasion or pressure, for example from being walked on or pushed against. Facing layer 410 is resistant to damage or degradation due to UV light. Facing layer 410 is resistant to chlorine or other chemicals used in pools. Facing layer 410 is water-impermeable.

The material of facing layer 410 is flexible. Re-facing system 410 may exist as sheets or rolls which may be cut to the correct size during installation or may be pre-cut to standard sizes during manufacturing.

Facing layer 410 comprises a plasticized material, for example, PVC or TPO.

Adhesive layer 420 includes a first surface (top of adhesive layer 420) which is attached to the interior surface of facing layer 410, and a second surface (bottom of adhesive layer 420) which in use adheres to the interior of the pool.

Adhesive layer 420 comprises pressure-sensitive adhesive. The pressure-sensitive adhesive bonds to the interior of the pool after a sufficient amount of pressure is applied towards the interior of the pool on facing layer 410. The pressure may be applied with a tool such as a roller. The bond strength of the pressure-sensitive adhesive may range from 1 lb/inch to 20 lb/inch in 180° peel adhesion test.

Because facing layer 410 comprises plasticized material, the pressure-sensitive adhesive is resistant to plasticizer migration from the facing layers into the pressure-sensitive adhesive. Plasticizer migration could degrade the pressure-sensitive adhesive resulting in a loss of bonding between the re-facing system and pool. The pressure sensitive adhesive may be a self-crosslinking polymer based on elastomer (natural, butyl, nitrile, and styrene butadiene rubbers), acrylate or silicone resins with crosslink density that may range from 2% to 80%.

The pressure-sensitive adhesive may also be resistant to chlorine and other chemicals used for swimming pool water treatment, to high and/or low temperature and to water.

The interior of the pool may require cleaning or other treatment before re-facing system 400 may be applied to the pool.

FIG. 5 is a side view of a re-facing system 500 including a plasticized facing layer and an adhesive layer in use on a roof 560, according to one embodiment.

Re-facing system 500 may be similar to re-facing system 100 of FIG. 1 or re-facing system 200 of FIG. 2A. Re-facing system 500 includes facing layer 510 and adhesive layer 520. FIG. 5 represents only a sub-section of roof 560.

Facing layer 510 has an exterior surface (top of facing layer 510) and an interior surface (bottom of facing layer 510). The exterior surface of facing layer 510 has an appearance and texture which is desired by the owner of the roof (or customer). That is, the exterior surface may have an appearance in both pattern and colour that would be desired by a customer, for example the exterior surface may mimic cedar shakes.

The texture of the exterior surface is suitable for a roof. For example, re-facing system 500 should not allow collection of leaves, ice, etc.

Facing layer 510 is resistant to high or low temperatures, i.e., does not melt or crack at temperatures normal to the climate it is in. Facing layer 510 is resistant to abrasion or pressure. Facing layer 510 is resistant to damage or degradation due to UV light. Facing layer 510 is water-resistant.

The material of facing layer 510 may be rigid, semi-rigid, or flexible. Re-facing system 510 may exist as sheets or rolls which may be cut to the correct size during installation or may be pre-cut to standard sizes during manufacturing.

Facing layer 510 comprises a plasticized material, for example, PVC or TPO.

Adhesive layer 520 includes a first surface (top of adhesive layer 520) which is attached to the interior surface of facing layer 510, and a second surface (bottom of adhesive layer 520) which in use adheres to the roof.

Adhesive layer 520 comprises pressure-sensitive adhesive. The pressure-sensitive adhesive bonds to the roof after a sufficient amount of pressure is applied towards the surface of the roof on facing layer 510. The pressure may be applied with a tool such as a roller. The bond strength may range from 1 lb/inch to 20 lb/inch in 180° peel adhesion test.

Because facing layer 510 comprises plasticized material, the pressure-sensitive adhesive is resistant to plasticizer migration from the facing layers into the pressure-sensitive adhesive. Plasticizer migration could degrade the pressure-sensitive adhesive resulting in a loss of bonding between the re-facing system and roof, and/or degradation of the roof. The pressure sensitive adhesive may be a self-crosslinking polymer based on elastomer (natural, butyl, nitrile, and styrene butadiene rubbers), acrylate or silicone resins with crosslink density that may range from 2% to 80%.

The pressure-sensitive adhesive may also be resistant to high and/or low temperature and to water.

The roof may require cleaning or other treatment before re-facing system 500 may be applied to the roof.

FIG. 6 is a side view of a re-facing system 600 including a plasticized facing layer and an adhesive layer in use on a window frame 670, according to one embodiment.

Re-facing system 600 may be similar to re-facing system 100 of FIG. 1 or re-facing system 200 of FIG. 2A. Re-facing system 600 includes facing layer 610 and adhesive layer 620. FIG. 6 represents only a sub-section of window frame 670.

Facing layer 610 has an exterior surface (top of facing layer 610) and an interior surface (bottom of facing layer 610). The exterior surface of facing layer 610 has an appearance and texture which is desired by the owner of the window frame (or customer). That is, the exterior surface may have an appearance in both pattern and colour that would be desired by a customer.

The texture of the exterior surface is suitable for a window frame. For example, re-facing system 600 should withstand an exterior environment.

Facing layer 610 is resistant to high or low temperatures, i.e., does not melt or crack at temperatures normal to the climate it is in. Facing layer 610 is resistant to abrasion or pressure. Facing layer 610 is resistant to damage or degradation due to UV light. Facing layer 610 is water-resistant.

The material of facing layer 610 may be rigid, semi-rigid, or flexible. Re-facing system 610 may exist as sheets or rolls which may be cut to the correct size during installation or may be pre-cut to standard sizes during manufacturing.

Facing layer 610 comprises a plasticized material, for example, PVC or TPO.

Adhesive layer 620 includes a first surface (top of adhesive layer 620) which is attached to the interior surface of facing layer 610, and a second surface (bottom of adhesive layer 620) which in use adheres to the window frame.

Adhesive layer 620 comprises pressure-sensitive adhesive. The pressure-sensitive adhesive bonds to the window frame after a sufficient amount of pressure is applied towards the surface of the window frame on facing layer 510. The pressure may be applied with a tool such as a roller. The bond strength may range from 1 lb/inch to 20 lb/inch in 180° peel adhesion test.

Because facing layer 610 comprises plasticized material, the pressure-sensitive adhesive is resistant to plasticizer migration from the facing layers into the pressure-sensitive adhesive. Plasticizer migration could degrade the pressure-sensitive adhesive resulting in a loss of bonding between the re-facing system and window frame, and/or degradation of the window frame. The pressure sensitive adhesive may be a self-crosslinking polymer based on elastomer (natural, butyl, nitrile, and styrene butadiene rubbers), acrylate or silicone resins with crosslink density that may range from 2% to 80%.

The pressure-sensitive adhesive may also be resistant to high and/or low temperature and to water.

The window frame may require cleaning or other treatment before re-facing system 600 may be applied to the window frame.

Figure 7:
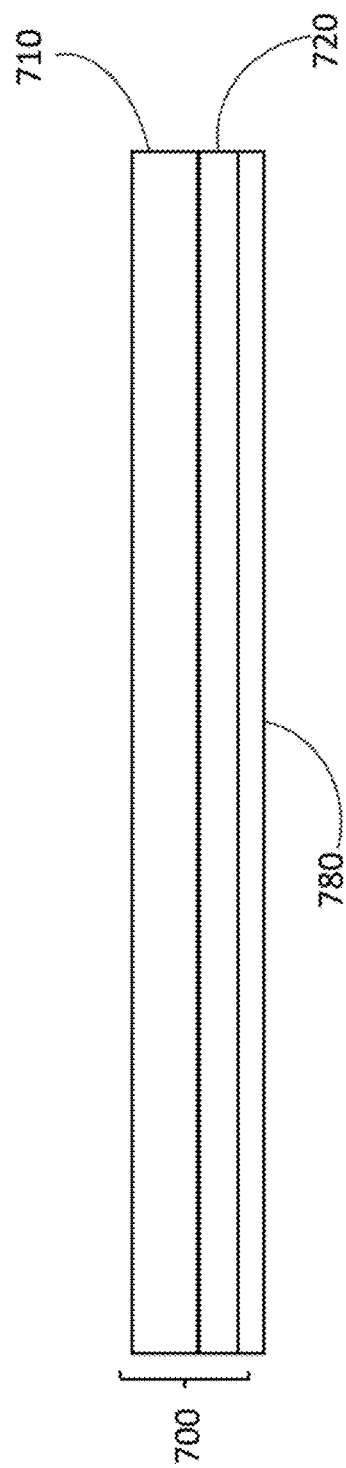
FIG. 7 is a side view of a re-facing system including a plasticized facing layer and an adhesive layer in use on a door frame, according to one embodiment.

FIG. 7 is a side view of a re-facing system 700 including a plasticized facing layer and an adhesive layer in use on a door frame 780, according to one embodiment.

Re-facing system 700 may be similar to re-facing system 100 of FIG. 1 or re-facing system 200 of FIG. 2A. Re-facing system 700 includes facing layer 710 and adhesive layer 720. FIG. 7 represents only a sub-section of door frame 780.

Facing layer 710 has an exterior surface (top of facing layer 710) and an interior surface (bottom of facing layer 710). The exterior surface of facing layer 710 has an appearance and texture which is desired by the owner of the door frame (or customer). That is, the exterior surface may have an appearance in both pattern and colour that would be desired by a customer.

The texture of the exterior surface is suitable for a door frame. For example, re-facing system 700 should withstand an exterior environment.

Facing layer 710 is resistant to high or low temperatures, i.e., does not melt or crack at temperatures normal to the climate it is in. Facing layer 710 is resistant to abrasion or pressure. Facing layer 710 is resistant to damage or degradation due to UV light. Facing layer 710 is water-resistant.

The material of facing layer 710 may be rigid, semi-rigid, or flexible. Re-facing system 710 may exist as sheets or rolls which may be cut to the correct size during installation or may be pre-cut to standard sizes during manufacturing.

Facing layer 710 comprises a plasticized material, for example, PVC or TPO.

Adhesive layer 720 includes a first surface (top of adhesive layer 720) which is attached to the interior surface of facing layer 710, and a second surface (bottom of adhesive layer 720) which in use adheres to the door frame.

Adhesive layer 720 comprises pressure-sensitive adhesive. The pressure-sensitive adhesive bonds to the door frame after a sufficient amount of pressure is applied towards the surface of the door frame on facing layer 710. The pressure may be applied with a tool such as a roller. The bond strength may range from 1 lb/inch to 20 lb/inch in 180° peel adhesion test.

Because facing layer 710 comprises plasticized material, the pressure-sensitive adhesive is resistant to plasticizer migration from the facing layers into the pressure-sensitive adhesive. Plasticizer migration could degrade the pressure-sensitive adhesive resulting in a loss of bonding between the re-facing system and door frame, and/or degradation of the door frame. The pressure sensitive adhesive may be a self-crosslinking polymer based on elastomer (natural, butyl, nitrile, and styrene butadiene rubbers), acrylate or silicone resins with crosslink density that may range from 2% to 80%.

The pressure-sensitive adhesive may also be resistant to high and/or low temperature and to water.

The door frame may require cleaning or other treatment before re-facing system 700 may be applied to the door frame.

Figure 8:
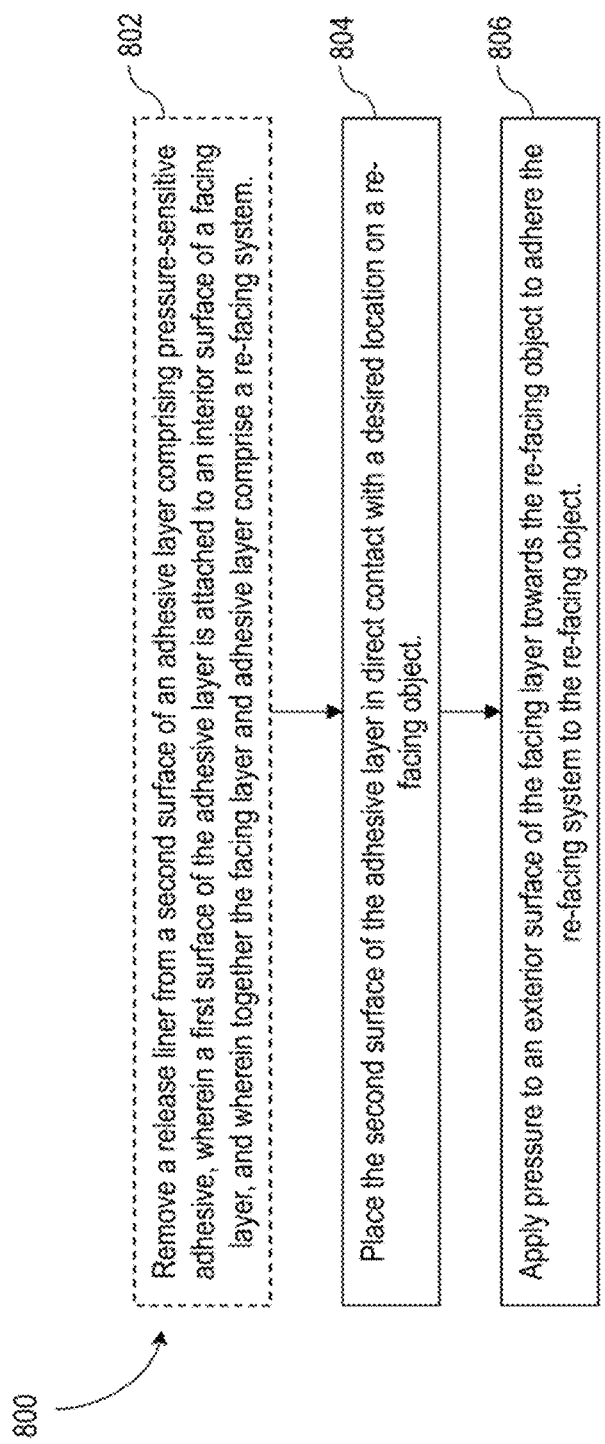
FIG. 8 is a flow diagram of a method of using a re-facing system including a plasticized facing layer and an adhesive layer on a re-facing object, according to one embodiment.

FIG. 8 is a flow diagram of a general method 800 of installing a re-facing system including a plasticized facing layer and an adhesive layer on a re-facing object, according to one embodiment. The facing layer includes an exterior surface with properties suited to the application and an interior surface. A first surface of the adhesive layer is attached to the interior surface of the facing layer. A second surface of the adhesive layer is for adhering to the re-facing object, such as a deck, pool, roof, window frame, or door frame. The adhesive layer comprises a pressure-sensitive adhesive which is resistant to plasticizer migration from the facing layer.

Optionally, the re-facing system may further include a release liner which is attached to the second surface of the adhesive layer to protect the adhesive layer until installation of the re-facing system.

At 802, an optional step if a release line is present, the release liner is removed from the second surface of the adhesive layer. The release liner may be a single piece which covers the entire surface of the adhesive layer or may be several pieces which cover the second surface of the adhesive layer.

At 804, the re-facing system is placed in a desired location on the re-facing object by establishing direct contact between the second surface of the adhesive layer and the surface of the re-facing object.

The re-facing system may be rigid, semi-rigid, or flexible. For flexible re-facing systems the placing of the re-facing system may include un-rolling the re-facing system onto the surface of the re-facing object.

The re-facing system may require cutting to achieve a desired size and shape which matches the surface of the re-facing object.

At 806, pressure is applied to the re-facing system towards the surface of the re-facing object to adhere the adhesive layer of the re-facing system to the re-facing object.

A material which provides sufficient pressure to the re-facing system to establish a bond between the pressure-sensitive adhesive and the surface of the re-facing object may be used. For example, a rolling device, such as a steel or silicone roller, may be used to apply pressure to the re-facing system. An initial method of applying pressure such as manual applying pressure using hands may be used and followed by a second application of pressure from a tool such as a rolling device.

The re-facing system may comprises sheets, tiles, or rolls which may or may not overlap to cover the surface of the re-facing object.

In some embodiments of a method of installing a re-facing system their may be additional steps or steps may happen in a different order. For example, a release liner may not be completely removed from a roll of the re-facing system. Instead a section of the release liner may be removed and the uncovered adhesive layer may be placed on the re-facing object and then a new section of release liner removed and that new section of uncovered adhesive layer place on the re-facing object, and so on.

Figure 9:
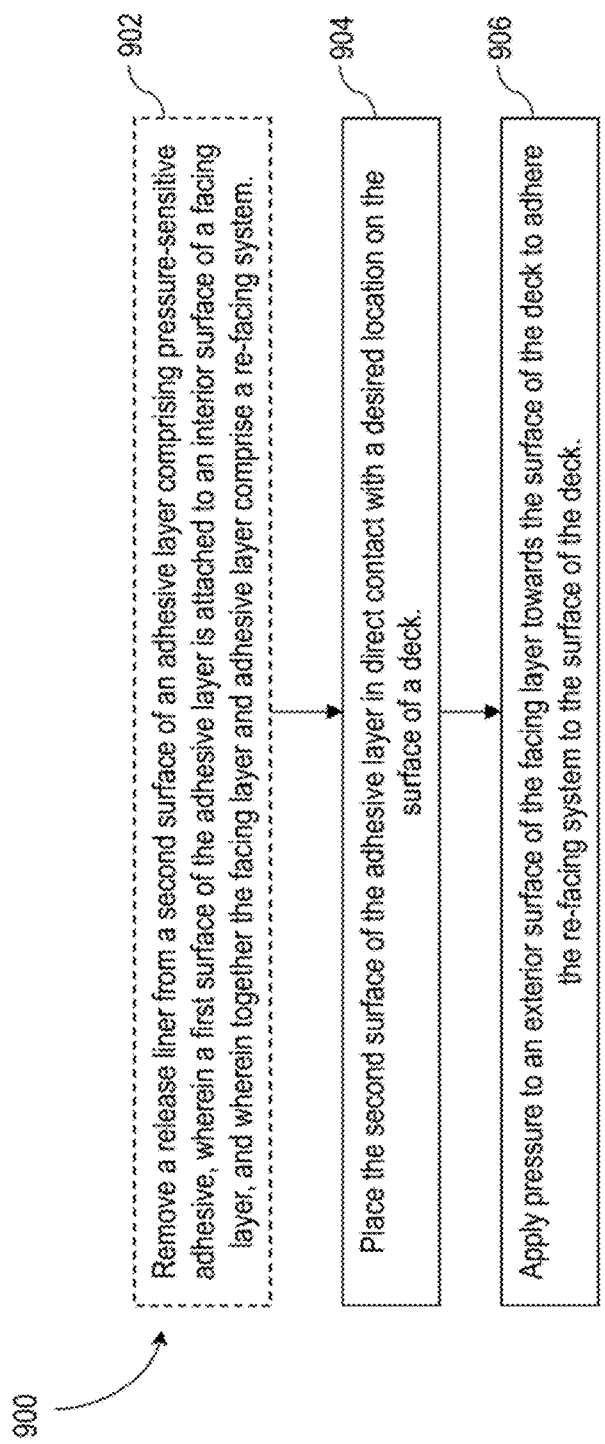
FIG. 9 is a flow diagram of a method of using a re-facing system including a plasticized facing layer and an adhesive layer on a deck, according to one embodiment.

FIG. 9 is a flow diagram of a method 900 of installing a re-facing system including a plasticized facing layer and an adhesive layer on a deck, according to one embodiment. The facing layer includes an exterior surface, with properties suited to use in decking, and an interior surface. A first surface of the adhesive layer is attached to the interior surface of the facing layer. A second surface of the adhesive layer is for adhering to the surface (s) of the deck. The adhesive layer comprises a pressure-sensitive adhesive which is resistant to plasticizer migration from the facing layer.

The properties of the facing layer may include, but are not limited to, UV resistance, water resistance, temperature resistance, and abrasion resistance. The facing layer may be embossed to look and feel like wood or otherwise have an appearance and texture which is desired by the customer.

Optionally, the re-facing system may further include a release liner which is attached to the second surface of the adhesive layer to protect the adhesive layer until installation of the re-facing system onto the deck.

At 902, an optional step if a release liner is present, the release liner is removed from the second surface of the adhesive layer. The release liner may be a single piece which covers the entire surface of the adhesive layer or may be several pieces which cover the second surface of the adhesive layer.

At 904, the re-facing system is placed in a desired location on the deck by establishing direct contact between the second surface of the adhesive layer and the surface of the deck.

The re-facing system may be semi-rigid or flexible. For flexible re-facing systems the placing of the re-facing system may include un-rolling the re-facing system onto the surface of the deck.

The re-facing system may require cutting to achieve a desired size and shape which matches the surface of the deck. Preferably, the re-facing system is pre-cut or sized during manufacturing to match at least the width but also possibly the length of standard deck boards. This would mean that less cuts would be required to cover the surface of the deck.

At 906, pressure is applied to the re-facing system towards the surface of the deck to adhere the adhesive layer of the re-facing system to the deck.

A material which provides sufficient pressure to the re-facing system to establish a bond between the pressure-sensitive adhesive and the surface of the deck may be used. For example, a rolling device, such as a steel or silicone roller, may be used to apply pressure to the re-facing system. An initial method of applying pressure such as manual applying pressure using hands may be used and followed by a second application of pressure from a tool such as a rolling device.

In some embodiments of a method of installing a re-facing system their may be additional steps or steps may happen in a different order. For example, in some embodiment the surface of the deck may require cleaning or treatment before the re-facing system may be applied.

Figure 10:
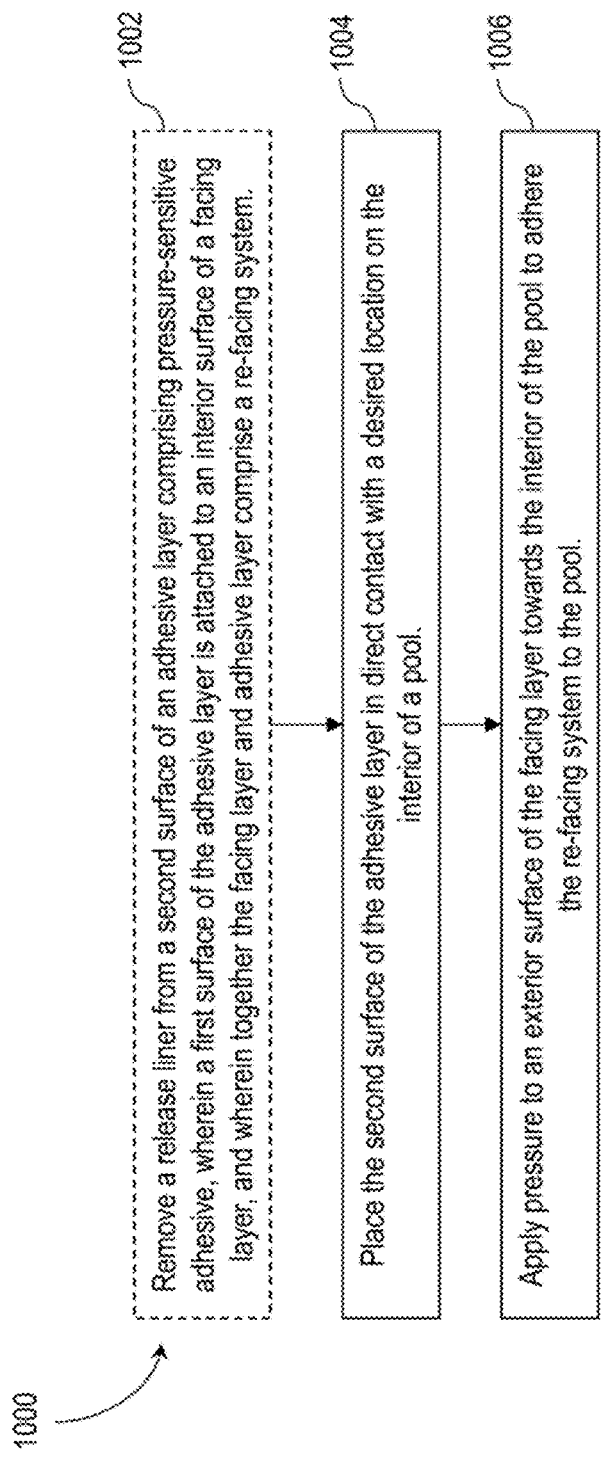
FIG. 10 is a flow diagram of a method of using a re-facing system including a plasticized facing layer and an adhesive layer on a pool, according to one embodiment.

FIG. 10 is a flow diagram of a method 1000 of installing a re-facing system including a plasticized facing layer and an adhesive layer on a pool, according to one embodiment. The facing layer includes an exterior surface, with properties suited to use in a pool, and an interior surface. A first surface of the adhesive layer is attached to the interior surface of the facing layer. A second surface of the adhesive layer is for adhering to an interior surface of the pool. The adhesive layer comprises a pressure-sensitive adhesive which is resistant to plasticizer migration from the facing layer.

The properties of the facing layer may include, but are not limited to, UV resistance, water resistance, temperature resistant, abrasion resistance, and chlorine resistance. The facing layer has an appearance and texture which is appropriate and desired by the customer for application in a pool. The facing layer may be phosphorescent (glow-in-the-dark) or may be color-changing.

Optionally, the re-facing system may further include a release liner which is attached to the second surface of the adhesive layer to protect the adhesive layer until installation of the re-facing system.

At 1002, an optional step if a release liner is present, the release liner is removed from the second surface of the adhesive layer. The release liner may be a single piece which covers the entire surface of the adhesive layer or may be several pieces which cover the second surface of the adhesive layer.

At 1004, the re-facing system is placed in a desired location on the interior surface of the pool by establishing direct contact between the second surface of the adhesive layer and the interior surface of the pool. The re-facing system is flexible.

Placing of the re-facing system may include un-rolling the re-facing system onto the interior surface of the pool.

The re-facing system may require cutting to achieve a desired size and shape which matches the interior surface of the pool.

At 1006, pressure is applied to the re-facing system towards the interior surface of the pool to adhere the adhesive layer of the re-facing system to the interior surface of the pool.

A material is selected which provides sufficient pressure to the re-facing system to establish a bond between the pressure-sensitive adhesive and the interior surface of the pool may be used. For example, a rolling device, may be used to apply pressure to the re-facing system.

The re-facing system may overlap to cover the interior surface of the pool.

In some embodiments of a method of installing a re-facing system their may be additional steps or steps may happen in a different order. For example, in some embodiment the interior surface of the pool may require cleaning or treatment before the re-facing system may be applied.

Figure 11:
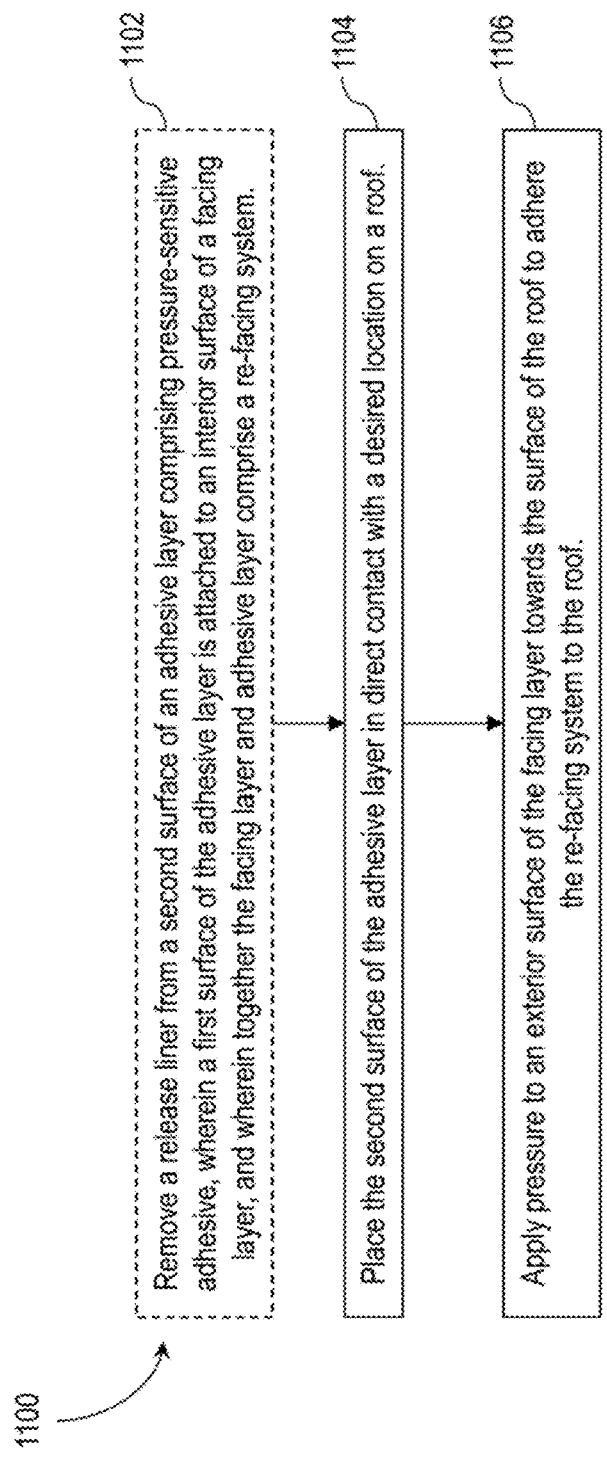
FIG. 11 is a flow diagram of a method of using a re-facing system including a plasticized facing layer and an adhesive layer on a roof, according to one embodiment.

FIG. 11 is a flow diagram of a method 1100 of installing a re-facing system including a plasticized facing layer and an adhesive layer on a roof, according to one embodiment. The facing layer includes an exterior surface, with properties suited to use on a roof, and an interior surface. A first surface of the adhesive layer is attached to the interior surface of the facing layer. A second surface of the adhesive layer is for adhering to the roof. The adhesive layer comprises a pressure-sensitive adhesive which is resistant to plasticizer migration from the facing layer.

The properties of the facing layer may include, but are not limited to, UV resistance, water resistance, temperature resistance, and abrasion resistance. The facing layer has an appearance and texture which is appropriate and desired by the customer for application on a roof.

Optionally, the re-facing system may further include a release liner which is attached to the second surface of the adhesive layer to protect the adhesive layer until installation of the re-facing system.

At 1102, an optional step if a release liner is present, the release liner is removed from the second surface of the adhesive layer. The release liner may be a single piece which covers the entire surface of the adhesive layer or may be several pieces which cover the second surface of the adhesive layer.

At 1104, the re-facing system is placed in a desired location on the roof by establishing direct contact between the second surface of the adhesive layer and the surface of the roof.

The re-facing system may be rigid, semi-rigid, or flexible. For flexible re-facing systems the placing of the re-facing system may include un-rolling the re-facing system onto the surface of the roof.

The re-facing system may require cutting to achieve a desired size and shape which matches the surface of the roof.

At 1106, pressure is applied to the re-facing system towards the surface of the roof to adhere the adhesive layer of the re-facing system to the roof. The method includes providing sufficient pressure to the re-facing system to establish a bond between the pressure-sensitive adhesive and the surface of the roof may be used. For example, a rolling device, such as a steel or silicone roller, may be used to apply pressure to the re-facing system. An initial method of applying pressure such as manual applying pressure using hands may be used and followed by a second application of pressure from a tool such as a rolling device.

The re-facing system may comprises sheets, tiles, or rolls which may or may not overlap to cover the surface of the roof.

In some embodiments of a method of installing a re-facing system their may be additional steps or steps may happen in a different order. For example, in some embodiment the surface of the roof may require cleaning or treatment before the re-facing system may be applied.

Figure 12:
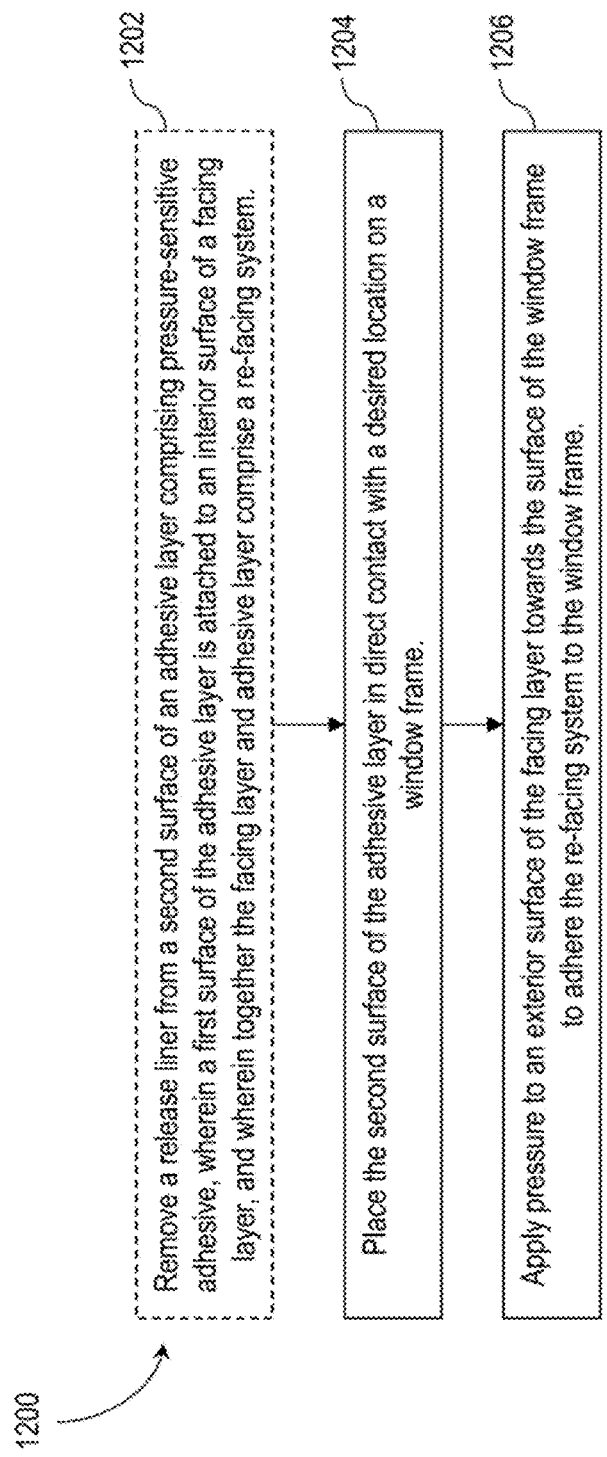
FIG. 12 is a flow diagram of a method of using a re-facing system including a plasticized facing layer and an adhesive layer on a window frame, according to one embodiment.

FIG. 12 is a flow diagram of a method 1200 of installing a re-facing system including a plasticized facing layer and an adhesive layer on a window frame, according to one embodiment. The facing layer includes an exterior surface, with properties suited to use on a window frame, and an interior surface. A first surface of the adhesive layer is attached to the interior surface of the facing layer. A second surface of the adhesive layer is for adhering to the window frame. The adhesive layer comprises a pressure-sensitive adhesive which is resistant to plasticizer migration from the facing layer.

The properties of the facing layer may include, but are not limited to, UV resistance, water resistance, temperature resistance, and abrasion resistance. The facing layer has an appearance and texture which is appropriate and desired by the customer for application on a window frame.

Optionally, the re-facing system may further include a release liner which is attached to the second surface of the adhesive layer to protect the adhesive layer until installation of the re-facing system.

At 1202, an optional step if a release line is present, the release liner is removed from the second surface of the adhesive layer. The release liner may be a single piece which covers the entire surface of the adhesive layer or may be several pieces which cover the second surface of the adhesive layer.

At 1204, the re-facing system is placed in a desired location on the window frame by establishing direct contact between the second surface of the adhesive layer and the surface of the window frame.

The re-facing system may be rigid, semi-rigid, or flexible. For flexible re-facing systems the placing of the re-facing system may include un-rolling the re-facing system onto the surface of the window frame.

The re-facing system may require cutting to achieve a desired size and shape which matches the surface of the window frame.

At 1206, pressure is applied to the re-facing system towards the surface of the window frame to adhere the adhesive layer of the re-facing system to the window frame. The method includes providing sufficient pressure to the re-facing system to establish a bond between the pressure-sensitive adhesive and the surface of the window frame may be used. For example, a rolling device, such as a steel or silicone roller, may be used to apply pressure to the re-facing system. An initial method of applying pressure such as manual applying pressure using hands may be used and followed by a second application of pressure from a tool such as a rolling device.

The re-facing system may comprises sheets, tiles, or rolls which may or may not overlap to cover the surface of the window frame.

In some embodiments of a method of installing a re-facing system their may be additional steps or steps may happen in a different order. For example, in some embodiment the surface of the window frame may require cleaning or treatment before the re-facing system may be applied.

Figure 13:
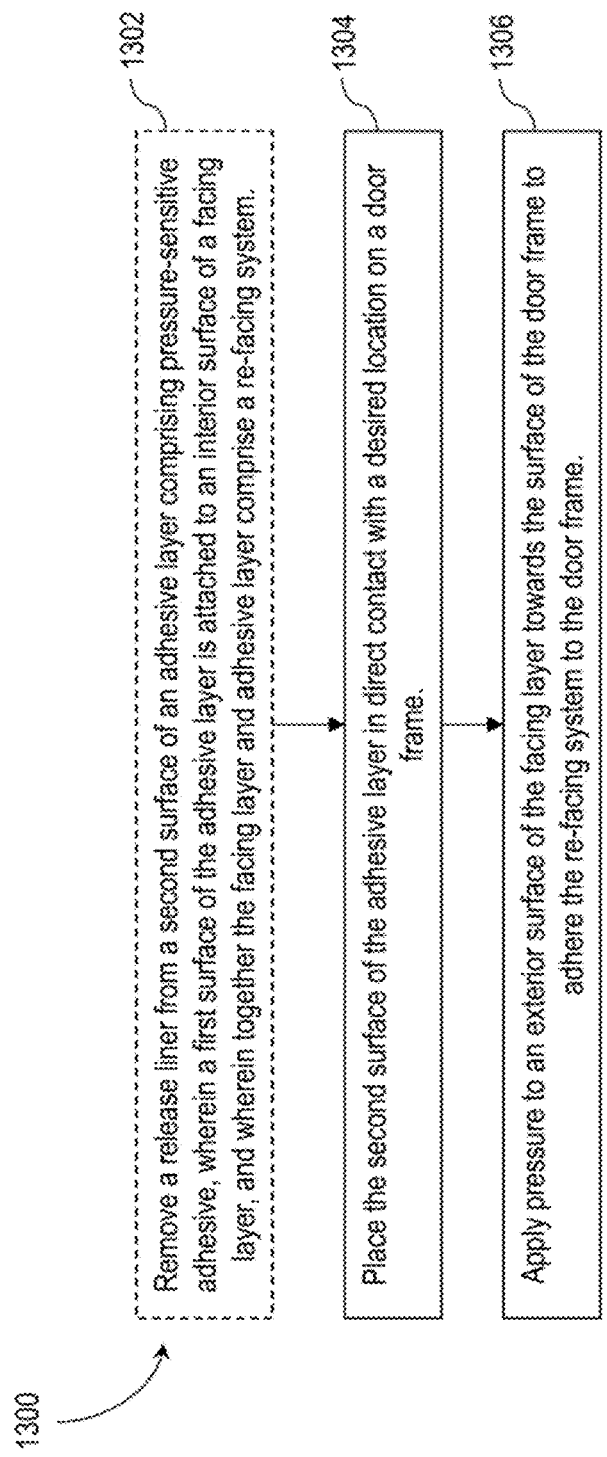
FIG. 13 is a flow diagram of a method of using a re-facing system including a plasticized facing layer and an adhesive layer on a door frame, according to one embodiment.

FIG. 13 is a flow diagram of a method 1300 of installing a re-facing system including a plasticized facing layer and an adhesive layer on a door frame, according to one embodiment. The facing layer includes an exterior surface, with properties suited to use on a door frame, and an interior surface. A first surface of the adhesive layer is attached to the interior surface of the facing layer. A second surface of the adhesive layer is for adhering to the door frame. The adhesive layer comprises a pressure-sensitive adhesive which is resistant to plasticizer migration from the facing layer.

The properties of the facing layer may include, but are not limited to, UV resistance, water resistance, temperature resistance, and abrasion resistance. The facing layer has an appearance and texture which is appropriate and desired by the customer for application on a door frame.

Optionally, the re-facing system may further include a release liner which is attached to the second surface of the adhesive layer to protect the adhesive layer until installation of the re-facing system.

At 1302, an optional step if a release line is present, the release liner is removed from the second surface of the adhesive layer. The release liner may be a single piece which covers the entire surface of the adhesive layer or may be several pieces which cover the second surface of the adhesive layer.

At 1304, the re-facing system is placed in a desired location on the door frame by establishing direct contact between the second surface of the adhesive layer and the surface of the door frame.

The re-facing system may be rigid, semi-rigid, or flexible. For flexible re-facing systems the placing of the re-facing system may include un-rolling the re-facing system onto the surface of the door frame.

The re-facing system may require cutting to achieve a desired size and shape which matches the surface of the door frame.

At 1306, pressure is applied to the re-facing system towards the surface of the door frame to adhere the adhesive layer of the re-facing system to the door frame. The method includes providing sufficient pressure to the re-facing system to establish a bond between the pressure-sensitive adhesive and the surface of the door frame may be used. For example, a rolling device, such as a steel or silicone roller, may be used to apply pressure to the re-facing system. An initial method of applying pressure such as manual applying pressure using hands may be used and followed by a second application of pressure from a tool such as a rolling device.

The re-facing system may comprises sheets, tiles, or rolls which may or may not overlap to cover the surface of the door frame.

In some embodiments of a method of installing a re-facing system their may be additional steps or steps may happen in a different order. For example, in some embodiment the surface of the door frame may require cleaning or treatment before the re-facing system may be applied. FIGS.

Figures 14A, 14B:
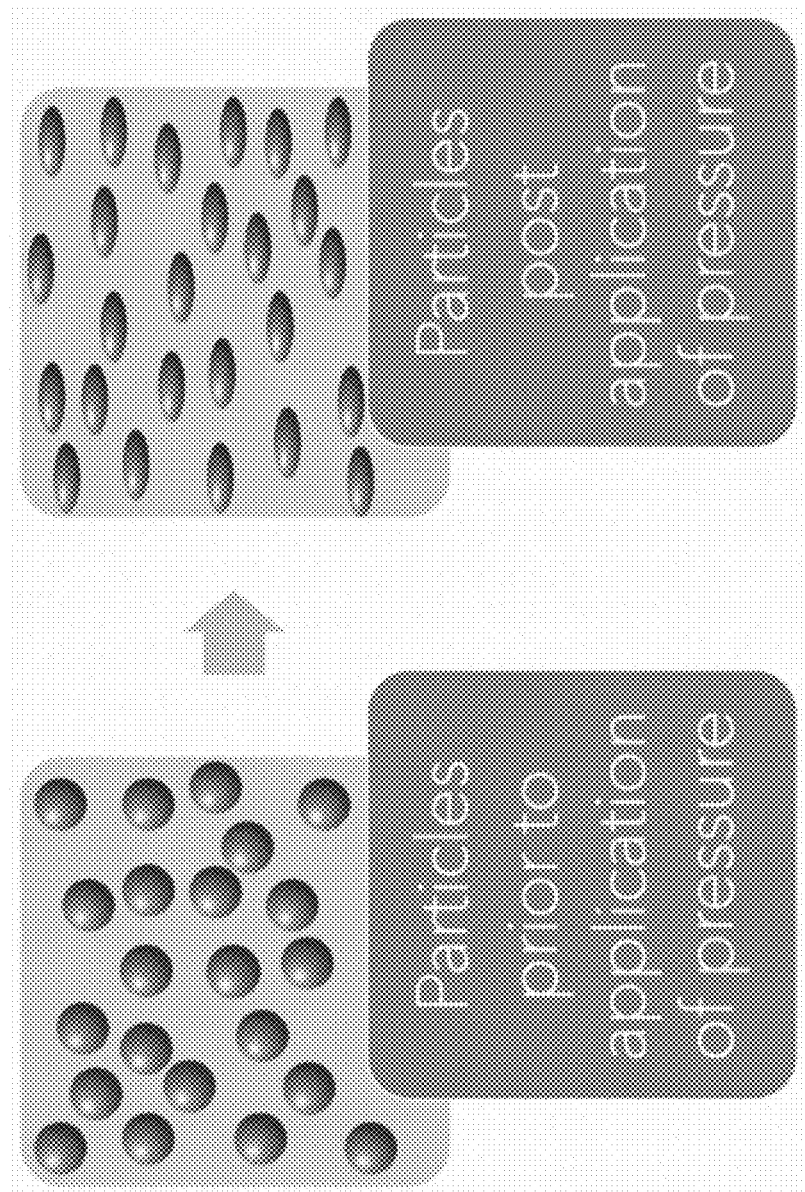
FIGS. 14A and 14B are representations of a pressure-sensitive adhesive before and after bonding, according to one embodiment.

14A and 14B are representations of a pressure-sensitive adhesive before and after bonding, according to one embodiment. FIG. 14A is a graphical representation of the pressure-sensitive adhesive prior to application of pressure and bonding to a material. FIG. 14B is a graphical representation of the pressure-sensitive adhesive after application of pressure and bonding of the adhesive to the material. The pressure-sensitive adhesive prior to application of pressure is represented by sphere or circular shapes which can loosely adhere to a release liner or other material. The pressure-sensitive adhesive upon application of pressure adopts an elongated spheroidal morphology which increases the surface area of the contact between the pressure-sensitive adhesive and the material thus establishing a stronger bond which is not easily reversible. While the above description provides examples of one or more apparatus, methods, or systems, it will be appreciated that other apparatus, methods, or systems may be within the scope of the claims as interpreted by one of skill in the art.

The invention claimed is:

1. An outdoor facing system for a re-facing object, the system comprising:
   a plasticized facing layer, the facing layer having an exterior surface and an interior surface; and
   an adhesive layer comprising a pressure-sensitive adhesive resistant to plasticizer migration, the adhesive layer having a first surface attached to the interior surface of the facing layer and a second surface for adhering the re-facing system to the re-facing object, wherein the pressure-sensitive adhesive prevents migration of plasticizer through the pressure-sensitive adhesive into the re-facing object, and wherein the pressure sensitive adhesive is a self-cross-linking polymer with crosslink density between 2% and 80%.

2. The system of claim 1, wherein the pressure-sensitive adhesive accepts no more than 20 percent migration of plasticizer into the pressure-sensitive adhesive.

3. The system of claim 2, wherein the pressure-sensitive adhesive prevents changes to the adhesive layer and prevents degradation of a bond between the re-facing system and the re-facing object.

4. The system of claim 1 further comprising:
   a release liner attached to the second surface of the adhesive layer, wherein prior to adhering the re-facing system to the re-facing object the second surface is exposed by removal of the release liner.

5. The system of claim 4, wherein the release liner is selected from the group consisting of silicon-coated paper, silicon-coated plastic, polypropylene (PP), and polyethylene (PE).

6. The system of claim 1, wherein the facing layer comprises any one or more of polyvinyl chloride (PVC), thermoplastic olefin (TPO), and is ultraviolet light (UV) resistant.

7. The system of claim 1, wherein the bond strength of the pressure-sensitive adhesive ranges from 1 lb/inch to 20 lb/inch in 180° peel adhesion test.

8. The system of claim 1, wherein the facing layer is temperature resistant at a range between −50° F. to 150° F.

9. The system of claim 1, wherein the facing layer is abrasion resistant.

10. The system of claim 1, wherein a physical property of the facing layer is selected from the group consisting of rigid, semi-rigid, and flexible.

11. The system of claim 1, wherein the re-facing system is selected from the group consisting of pre-cut tiles, a roll which can be cut to a desired size, and sheets which can be cut to a desired size.

12. The system of claim 1, wherein the re-facing object is any one or more of a deck and a lining of a pool.

13. The system of claim 1, wherein the pressure-sensitive adhesive is chlorine resistant.

14. The system of claim 13 wherein the facing layer is any one or more of chlorine resistant, phosphorescent, and can change color.

15. The system of claim 1, wherein the re-facing object is any one or more of a roof, a window frame, and a door frame.

16. A method of using an outdoor re-facing system to re-face a re-facing object, the system including a facing layer having an exterior surface and an interior surface, an adhesive layer having a first surface attached to the interior facing layer surface and a second surface comprising a pressure-sensitive adhesive, the method comprising:
   placing the second adhesive layer surface of the adhesive layer in direct contact with a desired location on the re-facing object; and
   applying pressure to the exterior facing layer surface of the re-facing system to adhere the re-facing system to the re-facing object by the pressure-sensitive adhesive of the adhesive layer, wherein the pressure-sensitive adhesive prevents migration of plasticizer through the pressure-sensitive adhesive into the re-facing object, and wherein the pressure sensitive adhesive is a self-cross-linking polymer with crosslink density between 2% and 80%.

17. The method of claim 16, wherein the pressure-sensitive adhesive accepts no more than 20 percent migration of plasticizer into the pressure-sensitive adhesive.

18. The method of claim 17, wherein the pressure-sensitive adhesive prevents changes to the adhesive layer and prevents degradation of a bond between the re-facing system and the re-facing object.

19. The method of claim 16, wherein the re-facing object is any one or more of a deck, a lining of a pool, a roof, a window frame, and a door frame.

20. The method of claim 16, wherein the re-facing system further includes a release liner attached to the second adhesive layer surface of the adhesive layer, and wherein the method further comprises removing the release liner from the adhesive layer.

* * * * *